Feb. 27, 1945.   G. E. DATH   2,370,291
FRICTION SHOCK ABSORBING MECHANISM
Filed Oct. 7, 1943
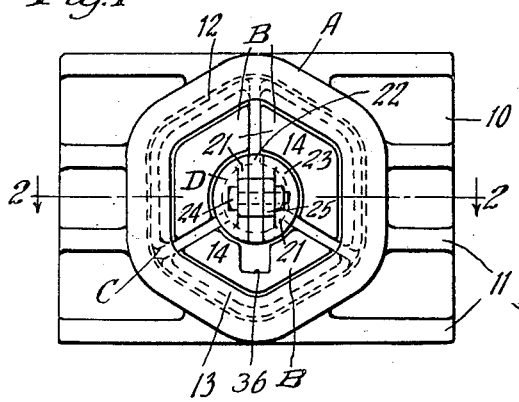
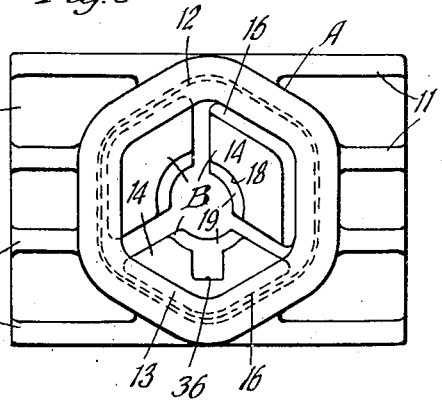
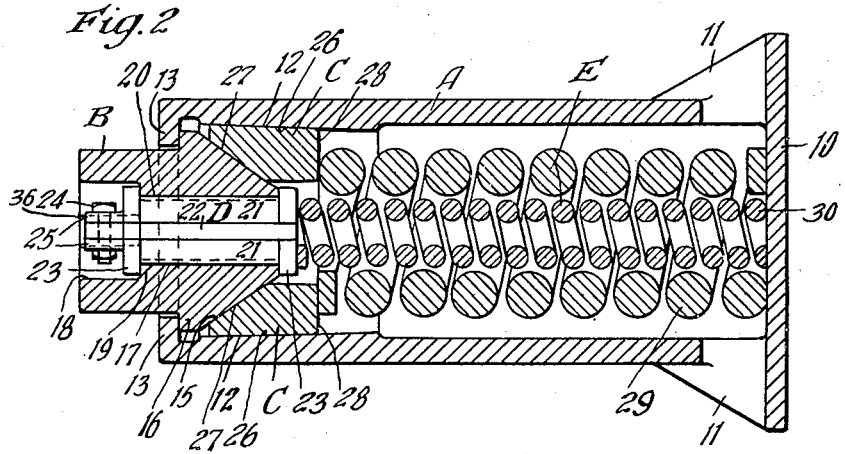
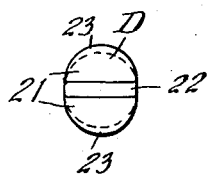
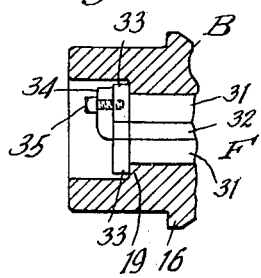
Inventor
George E. Dath
By Henry Fuchs
Atty.

Patented Feb. 27, 1945

2,370,291

UNITED STATES PATENT OFFICE 2,370,291

FRICTION SHOCK ABSORBING MECHANISM

George E. Dath, Chicago, Ill., assignor to W. H. Miner, Inc., Chicago, Ill., a corporation of Delaware Application October 7, 1943, Serial No. 505,310

7 Claims. (Cl. 213—34)

This invention relates to improvements in friction shock absorbing mechanisms.

One object of the invention is to provide a friction shock absorbing mechanism, especially adapted for draft riggings of railway cars, comprising a friction casing closed at one end and having the other end open, a friction clutch including a central wedge and friction shoes surrounding said wedge and having wedging engagement therewith and sliding frictional engagement with the interior walls of the friction casing, and spring resistance means opposing inward movement of the clutch, wherein all of the parts are insertable through the open end of the casing, and the parts are held assembled by shouldered engagement between the wedge and casing, the wedge being expandible to provide said shouldered engagement, simple and efficient retaining means being provided to maintain the wedge in the expanded condition.

A more specific object of the invention is to provide a friction shock absorbing mechanism as specified in the preceding paragraph, wherein the wedge is collapsible and comprises a plurality of sections which are held expanded by a three piece locking pin comprising a pair of outer sections insertable between the sections of the wedge when the latter is in its collapsed condition, and a central filler element for holding the outer sections of the pin spread apart to fill the space between the sections of the wedge when expanded, thereby maintaining the wedge and casing in shouldered engagement to limit outward movement of the wedge and hold the mechanism assembled.

Other objects of the invention will more clearly appear from the description and claims hereinafter following.

In the drawing forming a part of this specification, Figure 1 is a front elevational view of a friction shock absorbing mechanism embodying my improvements. Figure 2 is a horizontal, longitudinal, sectional view, corresponding substantially to the line 2—2 of Figure 1. Figure 3 is a view, similar to Figure 1, illustrating the manner of assembling the wedge and casing. Figure 4 is an end elevational view of the locking pin for the wedge, looking at the inner end of the latter. Figure 5 is a horizontal, sectional view, similar to Figure 2, illustrating a different embodiment of the invention, but showing only the outer end portions of the sectional wedge and locking pin.

Referring first to Figures 1 to 4 inclusive, my improved friction shock absorbing mechanism comprises broadly a casing A providing a combined friction shell and spring cage; a three piece split wedge B; three friction shoes C—C—C; a locking pin D; and a spring resistance E.

The casing A is of substantially hexagonal interior and exterior cross section having the friction shell section at the forward end which is open, and the spring cage section at the rear end thereof. The casing A is closed at the rear end by a transverse vertical wall 10 which projects at opposite sides beyond the side walls of the casing to provide a rear follower member of rectangular outline which is integral with the casing. The follower member is reinforced by webs 11—11 formed integral with the same and the casing side walls. The friction shell section of the casing is provided with six interior, substantially flat friction surfaces 12—12 which converge inwardly of the casing and are spaced symmetrically about the central longitudinal axis of the mechanism. The interior of the friction shell section thus presents six interior friction surfaces, adjacent surfaces of which are angularly disposed with reference to each other, thereby providing three pairs of surfaces, the adjacent members of each pair together forming a friction face of V-shaped transverse cross section.

At the open end the casing is provided with a continuous inturned retaining flange 13 which overhangs the opening and forms limiting stop means for the wedge block.

The wedge B is divided into three similar sections or blocks 14—14—14. As shown in Figure 1, the division of the wedge is on planes radial to the central longitudinal axis of the mechanism, and the blocks 14—14—14 are arranged symmetrically about said axis. Each block 14 has two rearwardly and inwardly converging wedge faces 15—15, six wedge faces thus being provided on the three blocks. The six wedge faces 15—15 are symmetrically arranged about the central longitudinal axis of the mechanism and cooperate respectively with the friction surfaces 12—12 of the casing. Three adjacent pairs of wedge faces are thus provided on the sectional wedge B, two on each block 14. The pair of wedge faces 15 of each block are angularly disposed with reference to each other, together forming a combined wedge face of V-shaped, transverse cross section, cooperating with the corresponding V-shaped friction face of the casing.

Outwardly beyond the wedge faces 15—15 thereof, the outer sides of each block 14 are inwardly offset, as shown most clearly in Figure 2, thereby providing a laterally extending stop shoulder 16 at the outer end of the wedge face adapted to engage in back of the flange 13 of the casing A to limit outward movement of the block. On the inner side, each block 14 is recessed longitudinally, as shown most clearly in Figures 1 and 2, to present a transversely curved, cylindrical surface 17 extending lengthwise of said block. Outwardly beyond the surface 17, the inner side of the block is laterally offset, said offset presenting a cylindrical surface 18 of greater radius than the surface 17 and concentric therewith. A laterally extending shoulder 19 is thus provided at the offset between the surfaces 17 and 18. In the assembled and expanded condition of the wedge B, as shown most clearly in Figures 1 and 2, the surfaces 17 and 18 of the three blocks 14—14—14 define a longitudinally extending, cylindrical opening 20 which is enlarged at its outer end, said opening being adapted to receive the locking pin D.

The locking pin D comprises a pair of outer members 21—21 and a filler member 22. The members 21—21 and 22 when assembled form a substantially cylindrical pin, as indicated in Figures 1 and 2, which completely fills the opening 20 of the wedge B to hold the latter expanded with the shoulder 16 thereof engaged in back of the flange 13 of the casing. Each outer section 21 is provided with laterally, outwardly extending, arc-shaped flanges 23—23 at opposite ends thereof adapted respectively to overlap the shoulder 19 at the outer end of the opening 20 of the wedge B and have shouldered engagement with the rear end of said wedge. The flanges 23—23 thus form heads at opposite ends of the pin for locking the same to the wedge. The central filler member 22 is in the form of an elongated flat plate or bar and when assembled between the sections 21—21 holds the pin expanded with the heads of the members 21—21 in shouldered engagement with the corresponding shoulders of the wedge B. The flanges 23—23 are of such a size that they will pass freely through the opening 20 of the expanded wedge when the member 22 is removed and the pin contracted. The filler element 22 is extended beyond the outer ends of the outer members 21—21, as shown in Figure 2, and is securely fixed to the outer members by a bolt 24 extending through an opening in said projecting portion and outstanding ears 25—25 on said outer members. As shown in Figures 1 and 3, one of the sections 14 of the wedge B is cut out or recessed, as indicated at 36, to provide clearance to permit application and removal of the bolt 24.

The friction shoes C, which are three in number, are interposed between the wedge B and the interior friction surfaces 12 of the casing. The three shoes C are of similar design except as hereinafter pointed out. Each shoe has a friction surface 26 on the outer side thereof of V-shaped transverse cross section which cooperates with the corresponding V-shaped friction face of the casing formed by two adjacent surfaces 12—12 of the casing. At the inner side, that is, the side nearest the central axis of the mechanism, each shoe has a wedge face 27 of V-shaped transverse cross section cooperating with two adjacent wedge faces 15—15 of the wedge block B, the two portions of the wedge face 27 forming the V being substantially flat and correspondingly inclined to the cooperating wedge faces 15—15 of the wedge. The engaging wedge faces of the wedge and two of the shoes are preferably disposed at relatively blunt wedging angles with respect to the longitudinal central axis of the mechanism, and those of the wedge and the remaining shoe are preferably disposed at a relatively keen wedging angle with respect to said axis. At their rear ends the shoes C—C—C are provided with substantially flat, transverse abutment faces 28 adapted to cooperate with the outer coil of the spring resistance means E.

The spring resistance E comprises a relatively heavy, outer coil 29 and a lighter inner coil 30. The outer coil 29 of the spring resistance has its opposite ends bearing respectively on the rear wall 10 of the casing and the flat inner end faces 28 of the shoes. The inner coil 30 has its opposite ends bearing respectively on the rear wall 10 of the casing and the inner end of the pin D, thereby resisting inward movement of the wedge B. The springs 29 and 30 forming the spring resistance E are preferably under initial compression in the assembled condition of the mechanism.

In assembling the mechanism, the spring resistance E and the shoes C—C—C are first placed within the casing A by inserting the same through the open front end of the casing. The sections 14—14—14 of the wedge are then inserted successively and displaced radially outwardly to engage the shoulders 16 thereof in back of the flange 13 of the casing, as indicated in Figure 3, which shows two of the blocks 14 thus engaged with the flange 13 and the third block inserted but not yet displaced radially outwardly to engage in back of the flange 13. As will be evident, the procedure of inserting the blocks 14 successively makes possible the use of blocks of maximum size and still have sufficient clearance to permit assembly of the blocks with the casing. After all of the blocks have been positioned within the casing and displaced radially to bring the shoulders thereof in back of the flange 13, that is, after the wedge B has been expanded, the pin D is inserted between the wedge sections 14—14—14, the two outer members 21—21 being first applied by inserting the same within the opening 20 of the wedge. The members 21—21 are then spread apart to engage the flanges thereof with the rear ends of the blocks 14—14—14 and the shoulders 19—19—19 at the front end of the opening 20. The spreading member 22 is then inserted between the members 21—21 and secured thereto by the bolt 24.

The operation of my improved shock absorbing mechanism is as follows: Upon inward movement of the wedge B with respect to the casing A being produced due to the compression of the mechanism, the spring resisted friction shoes are wedged apart and carried inwardly of the mechanism, the spring 29 being compressed by the shoes and the spring 30 by the wedge. High frictional resistance is thus produced between the friction surfaces of the shoes and casing. Upon the actuating force being removed, the expansive action of the spring resistance E returns all of the parts to the normal position shown in Figure 2, outward movement of the wedge being limited by engagement of the shoulders 16 thereof with the flanges 13 of the casing A.

Referring next to the embodiment of the invention illustrated in Figure 5, the design is the same as that hereinbefore described with the exception that the construction of the pin which holds the sections of the wedge expanded is slightly modified. The pin which holds the wedge B expanded is indicated by F in Figure 5. This pin is composed of outer members 31—31 and a filler member 32. The outer members 31—31 are identical with the outer members 21—21 of the pin D, hereinbefore described, with the exception that the securing ears are omitted. The front flanges of the members 31—31 are indicated by 33—33. The filler member 32 is similar to the filler member 22 hereinbefore described with the exception that the front end portion thereof is angularly bent, as indicated at 34, to overlie the outer end of one of the outer members 31. A cap screw 35 engaged through the angularly bent portion 34 of the member 32 and threaded into the member 31, which the bent portion 34 overlies, serves to fix the member 31 to said member 32. The filler element is thus held against accidental removal.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing open at one end and having interior stop shoulders at said open end; of a sectional collapsible wedge having shoulders engageable in back of the shoulders of the casing to limit outward movement of the wedge; friction shoes having sliding engagement with the interior walls of the casing and wedging engagement with said wedge; spring means opposing inward movement of said shoes; a pin engaged between the sections of the wedge to hold the same expanded with the shoulders thereof in cooperating relation with the stop shoulders of the casing; and means for holding said pin against lengthwise movement with respect to the wedge.

2. In a friction shock absorbing mechanism, the combination with a friction casing open at one end and having interior stop shoulders at said open end; of a sectional collapsible wedge having shoulders engageable in back of the shoulders of the casing to limit outward movement of the wedge; friction shoes having sliding engagement with the interior walls of the casing and wedging engagement with said wedge; spring means opposing inward movement of said shoes; and a filler element engaged between the sections of the wedge to hold the same expanded with the shoulders thereof in cooperating relation with the stop shoulders of the casing, said filler element being headed at opposite ends, said headed ends having shouldered engagement with the wedge at the inner and outer ends thereof.

3. In a friction shock absorbing mechanism, the combination with a friction casing open at one end and having interior stop shoulders at said open end; of a sectional collapsible wedge having shoulders engageable in back of the shoulders of the casing to limit outward movement of the wedge; friction shoes having sliding engagement with the interior walls of the casing and wedging engagement with said wedge; spring means opposing inward movement of said shoes; and a sectional pin engaged between the sections of the wedge to hold the same expanded with the shoulders thereof in cooperating relation with the stop shoulders of the casing, said sectional pin including a pair of outer members having heads at opposite ends in shouldered engagement with the wedge at the front and rear ends thereof and a filler element between said outer sections for holding the same spread apart.

4. In a friction shock absorbing mechanism, the combination with a friction casing open at one end and having interior stop shoulders at said open end; of a sectional collapsible wedge having shoulders engageable in back of the shoulders of the casing to limit outward movement of the wedge; friction shoes having sliding engagement with the interior walls of the casing and wedging engagement with said wedge; spring means opposing inward movement of said shoes; a three part sectional pin engaged between said sections of the wedge to hold the same expanded with the shoulders thereof in cooperating relation with the shoulders of the casing, said pin including two outer sections and a central filler element, said outer sections having heads at opposite ends in shouldered engagement with the wedge to hold said pin against longitudinal displacement with respect to the wedge; and means for securing said filler element to the outer sections.

5. In a friction shock absorbing mechanism, the combination with a friction casing open at one end and having interior stop shoulders at said open end; of a sectional collapsible wedge having shoulders engageable in back of the shoulders of the casing to limit outward movement of the wedge; friction shoes having sliding engagement with the interior walls of the casing and wedging engagement with said wedge; spring means opposing inward movement of said shoes; a sectional pin engaged between the sections of the wedge to hold the latter expanded, said sectional pin including a pair of outer members and a central filler member between said outer members, said outer members having laterally projecting flanges at the front and rear ends thereof in shouldered engagement with the wedge, said filler member having an angularly bent front end portion overlying one of said outer members; and means engaged through said bent portion for securing the filler member to said outer member.

6. In a friction shock absorbing mechanism, the combination with a friction casing open at one end and having inturned stop flanges at said open end; of a plurality of friction shoes having sliding frictional engagement with the interior of said casing; a three piece, lengthwise and radially divided, sectional, collapsible wedge having wedging engagement with the shoes, the sections of said wedge having laterally extending stop shoulders thereon engageable in back of the flanges of the casing to limit outward movement of the wedge; a three piece sectional spreading element between said section of the wedge to hold the wedge expanded with the shoulders thereof in position to engage said flanges of the casing, said spreading element comprising a pair of outer members and a central filler member for holding said outer members separated, said outer members having heads at opposite ends in shouldered engagement with said wedge; and spring means opposing inward movement of said shoes and wedge.

7. In a friction shock absorbing mechanism, the combination with a friction casing open at one end and having inturned stop flanges at said open end; of a plurality of friction shoes having sliding frictional engagement with the interior of said casing; a three piece, lengthwise and radially divided, sectional, collapsible wedge having wedging engagement with the shoes, the sections of said wedge having laterally extending stop shoulders thereon engageable in back of the flanges of the casing to limit outward movement of the wedge; a three piece sectional spreading element between said section of the wedge to hold the wedge expanded with the shoulders thereof in position to engage said flanges of the casing, said spreading element comprising a pair of outer members and a central filler member for holding said outer members separated, said outer members having heads at opposite ends in shouldered engagement with said wedge; a spring within the casing opposing inward movement of the shoes; and a second spring within the casing opposing inward movement of the wedge.

GEORGE E. DATH.